(12) United States Patent
Pelissier

(10) Patent No.: US 6,857,214 B1
(45) Date of Patent: Feb. 22, 2005

(54) SCENT DISPERSAL APPARATUS

(76) Inventor: Justin M. Pelissier, 31 Childs Rd., Monson, MA (US) 01057

( * ) Notice: Subject to any disclaimer, the term of this patent is extended or adjusted under 35 U.S.C. 154(b) by 0 days.

(21) Appl. No.: 10/077,643

(22) Filed: Feb. 15, 2002

Related U.S. Application Data
(60) Provisional application No. 60/269,313, filed on Feb. 16, 2001.

(51) Int. Cl.[7] ............................................... A01M 7/00
(52) U.S. Cl. .............................................. 43/1; 43/129
(58) Field of Search ........................... 43/113, 125, 129, 43/1; 239/142, 143; 261/121.1, 77, DIG. 88

(56) References Cited

U.S. PATENT DOCUMENTS

| | | | | |
|---|---|---|---|---|
| 2,758,412 A | * | 8/1956 | Loibl | 43/125 |
| 3,255,967 A | * | 6/1966 | Kenney | 43/125 |
| 3,694,146 A | * | 9/1972 | Roy | 43/125 |
| 4,228,124 A | * | 10/1980 | Kashihara | 43/129 |
| 4,283,878 A | * | 8/1981 | Hill | 43/129 |
| 5,241,779 A | * | 9/1993 | Lee | 43/113 |
| 5,305,541 A | * | 4/1994 | Simpson | 43/129 |
| 5,335,446 A | * | 8/1994 | Shigetoyo | 43/125 |
| 5,361,527 A | | 11/1994 | Burgeson | |
| 6,050,016 A | * | 4/2000 | Cox | 43/129 |
| 6,206,240 B1 | * | 3/2001 | Osgar et al. | 222/39 |
| 6,240,248 B1 | * | 5/2001 | Fore | 43/129 |
| 6,443,434 B1 | * | 9/2002 | Prather | 43/129 |

* cited by examiner

*Primary Examiner*—Kurt Rowan
(74) *Attorney, Agent, or Firm*—McCormick, Paulding & Huber LLP

(57) ABSTRACT

A scent dispersal apparatus includes a housing having an aperture for permitting gaseous communication between an interior of the housing and an ambient atmosphere. The scent dispersal apparatus also includes a gaseous flow device provided for generating a gaseous stream, and a scent reservoir. The gaseous flow device selectively entrains molecules of a scent disposed within the scent reservoir to form a scent laden gaseous stream, the scent laden gaseous stream being exhausted through the aperture to the ambient atmosphere.

18 Claims, 5 Drawing Sheets

SCENT DISPERSAL APPARATUS

CROSS REFERENCE TO RELATED APPLICATIONS

This application claims the benefit of pending U.S. Provisional Application No. 60/269,313, filed Feb. 16, 2001.

FIELD OF THE INVENTION

This invention relates in general to a scent dispersal apparatus, and deals more particularly with a scent dispersal apparatus which is compact and easily transportable, thereby enabling deployment in outdoor field conditions to disperse animal attractants and the like through the use of a scent laden gaseous stream.

BACKGROUND OF THE INVENTION

It has long been known that the majority of animal species have senses which are much more acute, on average, than that of humans. Indeed, many animals communicate and mark their territory through the use and deposition of naturally occurring chemical compounds, typically produced by a variety of glands or through the animals' excrement itself.

Hunters, researchers and photographers all utilize this knowledge by attempting to attract a particular species to a given location through the use of an animal attractant that is specific to the type or sex of animal which is desired to be hunted, studied or photographed.

Currently, there are many animal attractant products available on the market today. The most common way of dispersing these scents so as to attract a particular animal is either through drip systems or wick pads, a cotton swab-type product whereby a hunter or the like would drip some of the scent onto the swab and then place the swab in trees branches approximately 5 feet in the air around the hunting or photographing location. The object is to have natural wind currents pick up the odor emitted from the cotton wicks or drip systems and disperse them accordingly.

While these known systems are successful to a degree, they suffer from several logistical problems. Firstly, they are difficult to store and transport, typically involving many glass containers and applicators. Moreover, the actual preparation of the site chosen for dispersal of the scent is tedious, time consuming and very often disruptive to the surrounding wildlife during its application, a result which is obviously counterproductive to the application of the scent. Likewise, the effectiveness of the scent dispersal relies greatly upon environmental conditions which remain largely outside of human anticipation or control.

With the forgoing problems and concerns in mind, it is the general object of the present invention to provide a scent dispersal apparatus which overcomes the above-described drawbacks while maximizing effectiveness.

SUMMARY OF THE INVENTION

It is an object of the present invention to provide a scent dispersal apparatus.

It is another object of the present invention to provide a scent dispersal apparatus which is easily transportable and modular in design.

It is another object of the present invention to provide a scent dispersal apparatus which does not require the application of an animal attractant to the surrounding vegetation in order to be effective.

It is another object of the present invention to provide a scent dispersal apparatus which utilizes a scent laden gaseous stream.

It is another object of the present invention to provide a scent dispersal apparatus which may be operated over a period of time, thereby preserving the intensity of the dispersed scent.

These and other objectives of the present invention, and their preferred embodiments, shall become clear by consideration of the specification, claims and drawings taken as a whole.

BRIEF DESCRIPTION OF THE DRAWINGS

FIG. 1 is a partial cross-sectional side view of a scent dispersal apparatus according to one embodiment of the present invention.

FIG. 2 is a partial cross-sectional top view of the scent dispersal apparatus illustrated in FIG. 1.

FIG. 3 is a partial cross-sectional end view of the scent dispersal apparatus illustrated in FIG. 1.

FIG. 4 is a planar view of the exterior side of the scent dispersal apparatus, according to another embodiment of the present invention.

FIG. 4A is a planar view of the bottom of the scent dispersal apparatus illustrated in FIG. 4.

DETAILED DESCRIPTION OF THE PREFERRED EMBODIMENT

FIG. 1 illustrates a partial cross-sectional side view of a scent dispersal apparatus 100 according to one embodiment of the present invention. As depicted in FIG. 1, the scent dispersal apparatus 100 includes a housing 102 which is divided into two separate compartments, a first compartment 104 and a second compartment 106. The first compartment 104 accommodates a power source 108 (shown in FIG. 2) and a gaseous flow device 110.

As shown in FIG. 1, the gaseous flow device 110 is depicted as a blower, barrel fan or the like, and is arranged to be in electrical communication with the power source 108. When activated, the gaseous flow device 110 generates a gaseous stream 112 and directs this gaseous stream 112 to the second compartment 106 via a shroud adapter 114 fixed to the outlet side of the gaseous flow device 110.

Although the gaseous flow device 110 has been described as a blower/fan, the present invention is not limited in this regard as the gaseous stream 112 may be provided by any known system or device. In particular, a small compressor, or alternatively, a plurality of $CO^2$ containers may also be accommodated within the housing 102 for the purposes of providing the gaseous stream 112, without departing from the broader aspects of the present invention.

It will also be readily appreciated that the power source 108 may be rechargeable batteries, or the like, of a type and size which are appropriate to power the gaseous flow device 110 and any other electrically demanding instrumentation disposed in or around the scent dispersal apparatus 100, as will be described in more detail later. In the preferred embodiment of the present invention, the power source 108 is envisioned to be either a 9 volt or a 12 volt battery.

Returning to FIG. 1, the second compartment 106 accommodates a scent reservoir 116 for holding a supply of liquid animal scent 118. The liquid animal scent 118 is typically the urine or other hormonal essence of a predetermined animal species and may be either natural or synthetically made. In addition, although a liquid animal scent 118 has been described, solid tablets or bars of a similar composition may be utilized as a scent-provider without departing from the broader aspects of the present invention, provided that the solid scent-provider is disposed in the air path of the gaseous stream 112, as will be described in more detail later.

Figure 1:
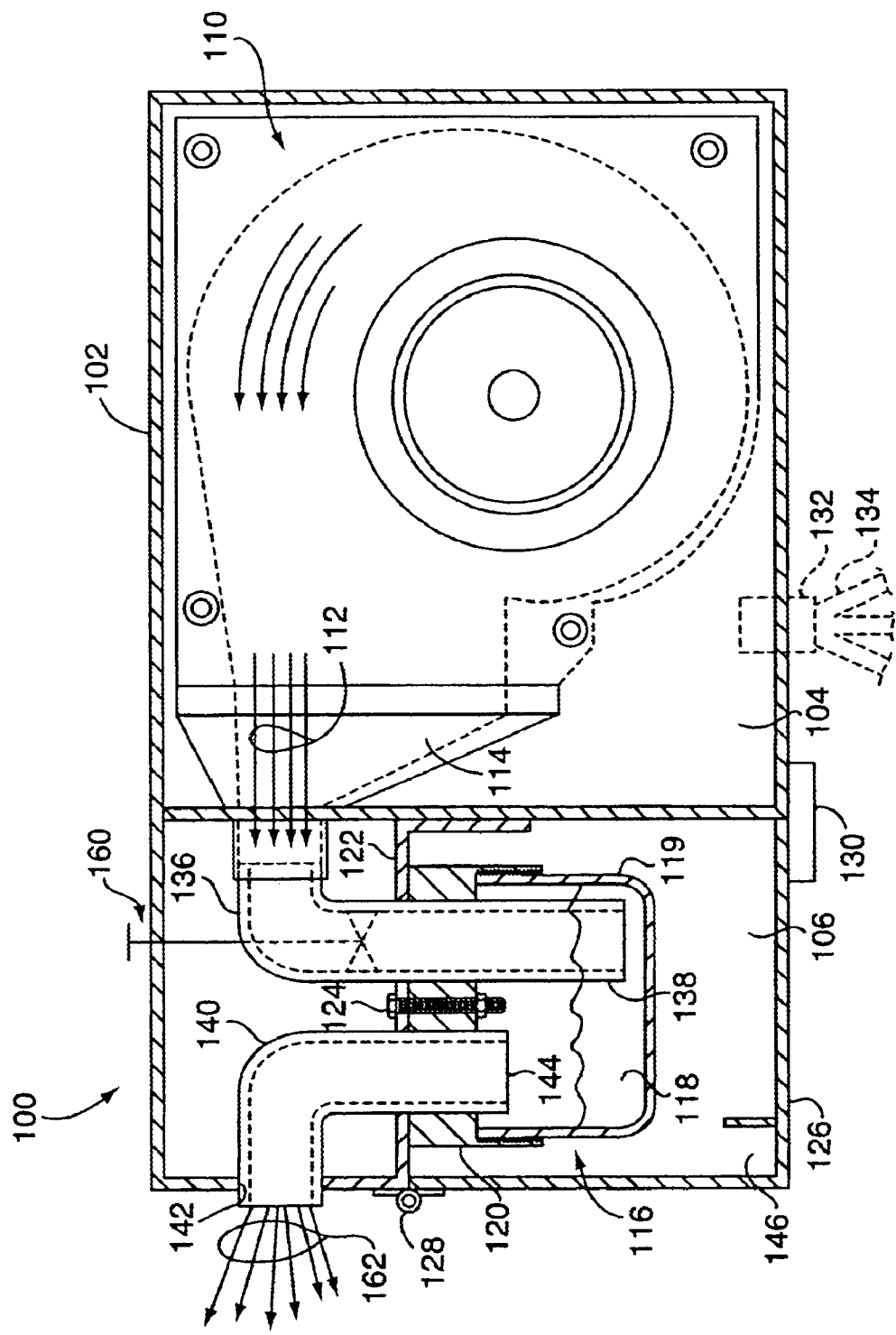

As is further illustrated in FIG. 1, the scent reservoir 116 is formed as a threaded jar portion 119 adapted to be selectively and threadedly engaged with a lid portion 120. The lid portion 120 includes matching internal threads and is fixed to an interior partition 122 of the housing 102 via a nut and bolt assembly 124, or the like. An access door 126 is designed to provide access to the scent reservoir 116 and is adapted to rotate about a hinge 128 and be securely closed utilizing a latch assembly 130. An interior pocket 146 may be provided in the second compartment 106 in which a heating element, such as a commercially available chemical hand warmer or the like, may be deposited to ensure that the liquid animal scent 118 does not freeze during operation of the scent dispersal apparatus 100.

Although a hinged access door 126 has been described, the access door 126 may also be formed to friction fit or, alternatively, may be formed from any of a number of known dove tails or lock-and-key configurations. The access door 126 may also slide relative to the housing 102, preferably in grooves formed in the exterior walls of the housing 102, whereby small notches or the like may be provided in the access door 126 to operate the same.

It should also be noted that the exterior walls of the scent dispersal apparatus 100 are insulated in anticipation for use in cold climates and, moreover, that the by-product heat generated by the gaseous flow device 110 assists the heating element disposed in the interior pocket 146 in keeping the liquid animal scent 118 free from freezing conditions. In addition, as there are many male deer, and other animal, scents available that are supposed to replicate the actual secretions of a female deer during the estroges period (female in heat), it is necessary to heat the liquid animal scent or attractant to ensure that the resultant scent laden gaseous stream exiting the scent dispersal apparatus 100 has similar characteristics as does the naturally occurring secretions. Given that natural secretions are leaving the female deer at a temperature of 97–100 degrees, the outgoing temperature of the liquid animal scent is preferably between approximately 95–100° F. The heating element may alternatively be a heat generating device which also draws operational power from the power source 108 and may be regulated by an integrated temperature sensor and control.

A threaded insert 132 may also be provided to the underside of the scent dispersal apparatus 100, to which a tripod 134 or the like may be engaged to support the scent dispersal apparatus a predetermined height above the ground.

It is therefore an important aspect of the present invention to ensure that the scent dispersal apparatus 100 may be supported a predetermined height above the ground during operation. Such an orientation will ensure a greater dispersal of the animal scent that is produced, owing to air currents and the like, as opposed to the scent dispersal apparatus 100 resting upon the ground itself.

As shown in FIG. 1, a first conduit 136 is positioned within the scent dispersal apparatus 100 and extends from the gaseous flow device 110 and through a first passage in the lid portion 120, whereby a distal end 138 of the first conduit 136 is disposed adjacent the bottom of the jar portion 119. As depicted in FIG. 1, the distal end 138 should be submerged under the level of the liquid animal scent 118 for maximum effectiveness during operation, as will be described later.

A second conduit 140 is also positioned within the scent dispersal apparatus 100 of FIG. 1 and extends from the jar portion 119, through a second passage in the lid portion 120 and out an aperture 142 in an exterior wall of the housing 102. A distal end 144 of the second conduit 140 is disposed adjacent the top of the jar portion 119 and should be above the level of the liquid animal scent 118 for maximum effectiveness during operation, as will also be described later.

Figure 2:
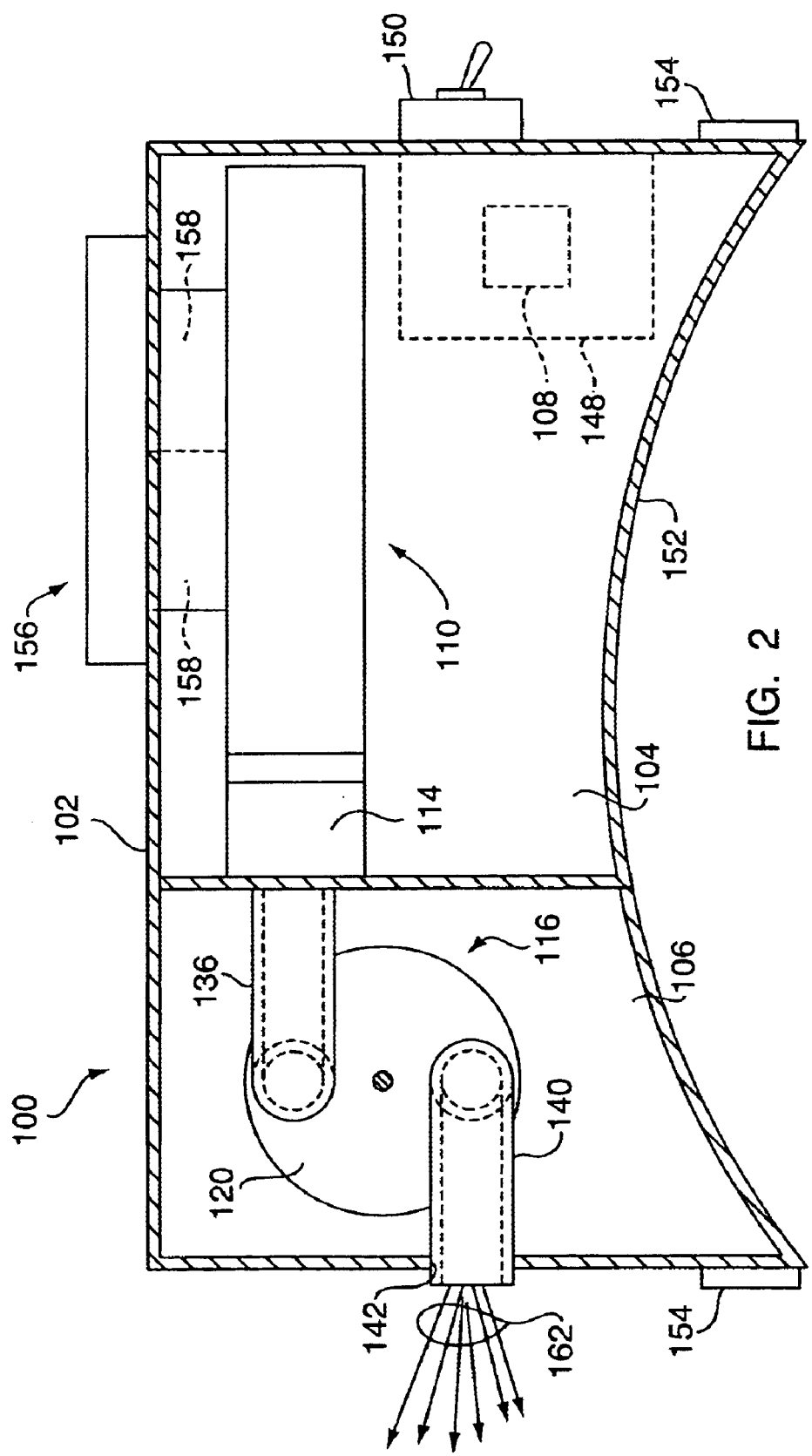

Turning now to the partial cross-sectional top view of the scent dispersal apparatus 100 as depicted in FIG. 2, a battery door 148 is formed in the housing 102 to provide access to the battery power source 108 therein. A toggle switch 150, or the like, is mounted upon the exterior of the housing 102 and serves to selectively permit electrical communication between the power supply 108 and the gaseous flow device 110, thus energizing the gaseous flow device 110 when operated. The scent dispersal apparatus 100 may also be provided with an optional timer, the purpose of which is to prolong battery life by switching off the gaseous flow device 110 after a predetermined active operation time. In such a manner, the scent dispersal apparatus 100 will preferably have enough power in the batteries to ensure an active operation time of approximately 5–6 hours, or longer. Moreover, the optional timer may be utilized to selectively operate the gaseous flow device 110 at predetermined times over the course of many days, such as during the dawn or dusk hours. The scent dispersal apparatus 100 may also be equipped with a remote control device for turning the scent dispersal apparatus 100 on or off remotely without manual activation of the toggle switch 150. This ensures that the scent dispersal apparatus 100 can be activated without approaching the unit or making any noise while animals are in close proximity. The remote control device may utilize radio, infrared or other known information transmission regimens without departing from the broader aspects of the present invention.

As further depicted in FIG. 2, the scent dispersal apparatus 100 includes an arcuately shaped exterior wall 152, as well as a pair of retaining brackets 154 located on either side of the scent dispersal apparatus 100. An operator may therefore utilize the brackets 154 to anchor belts, restraining straps or the like which, in turn, may be fastened about an operator of the scent dispersal apparatus 100 to assist in the transportation of the unit to the desired area of use. It is envisioned that the arcuate exterior wall 152 would approximately conform to the back of an operator while being so transported.

Figure 3:
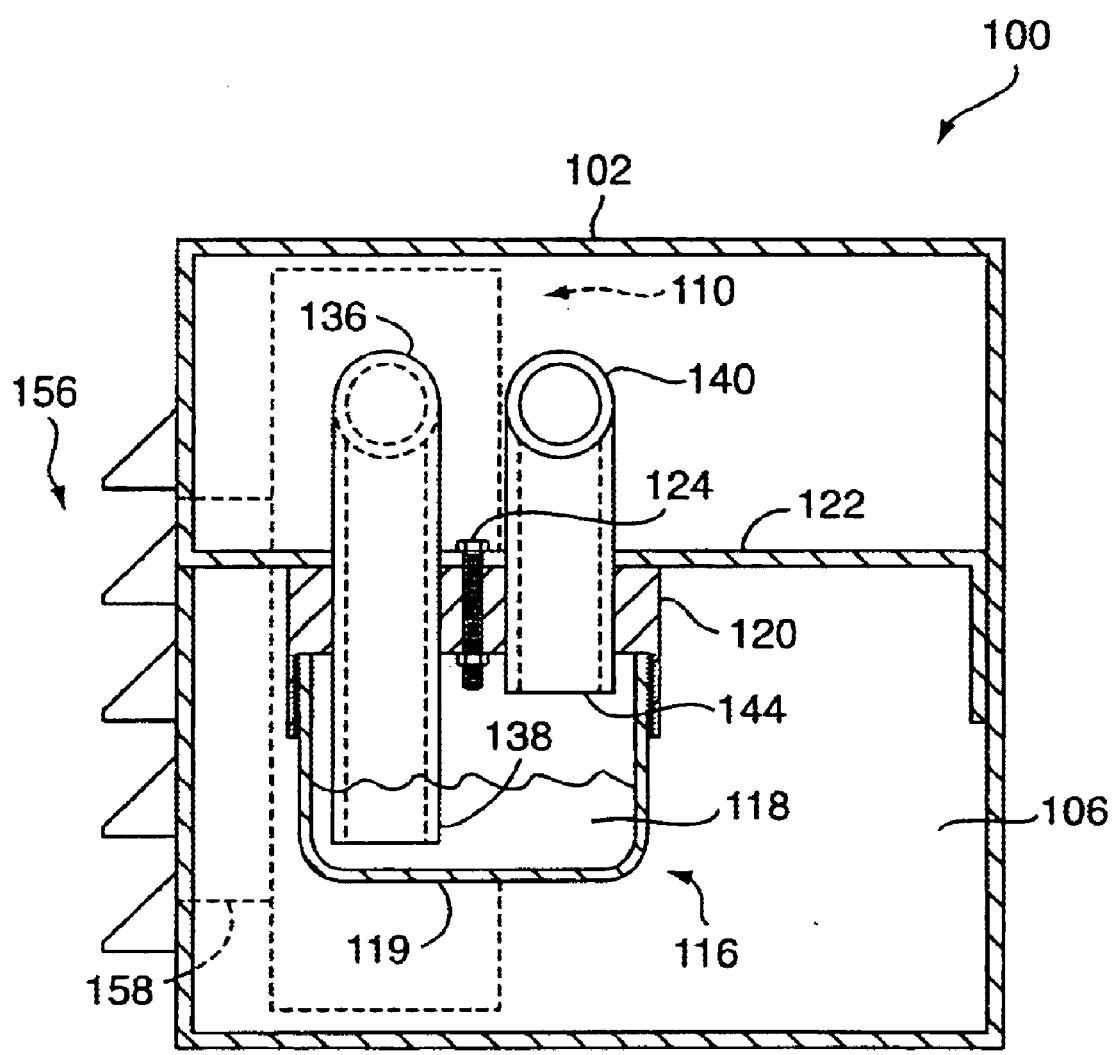
Figure 4:
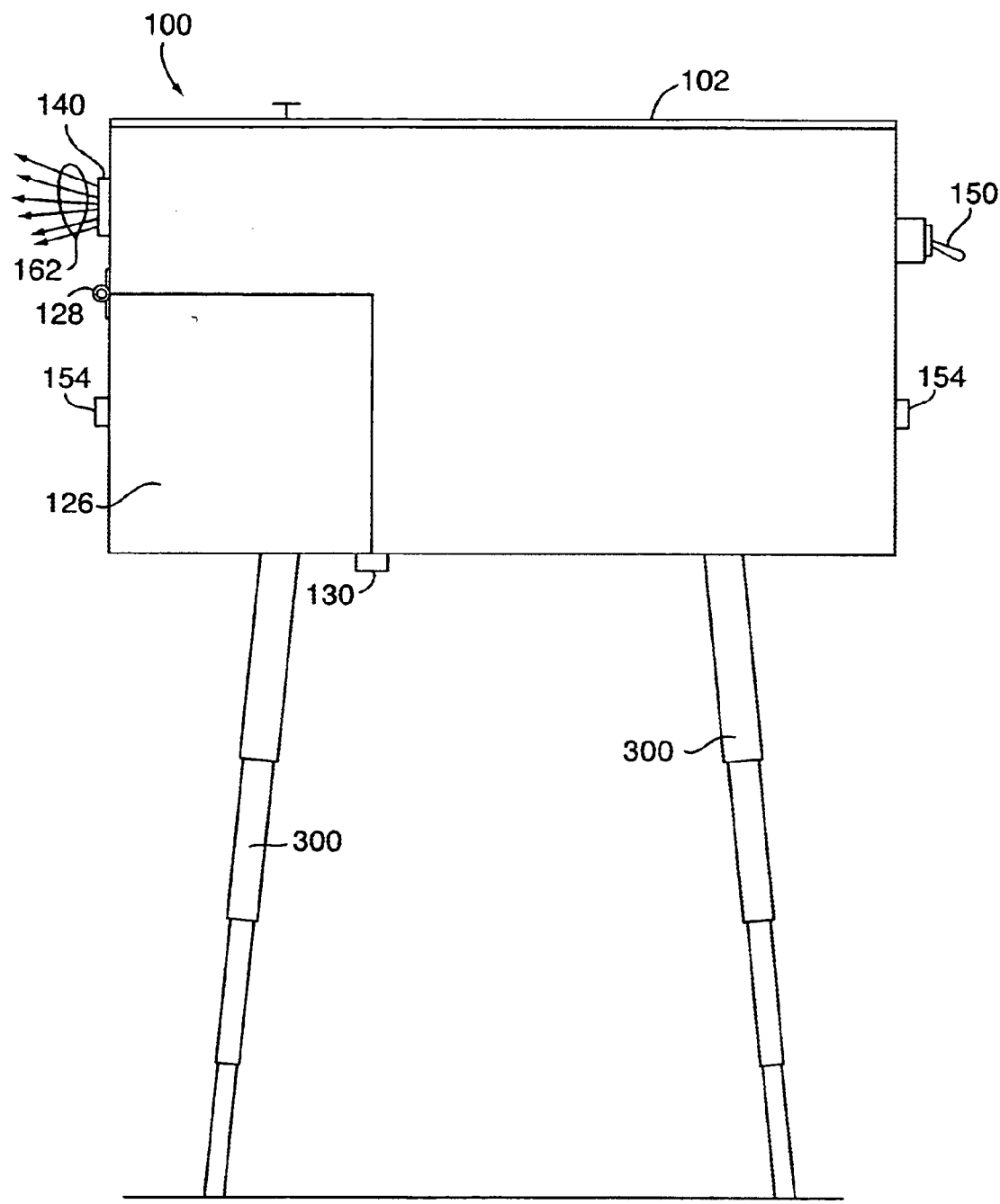
Figure 4A:
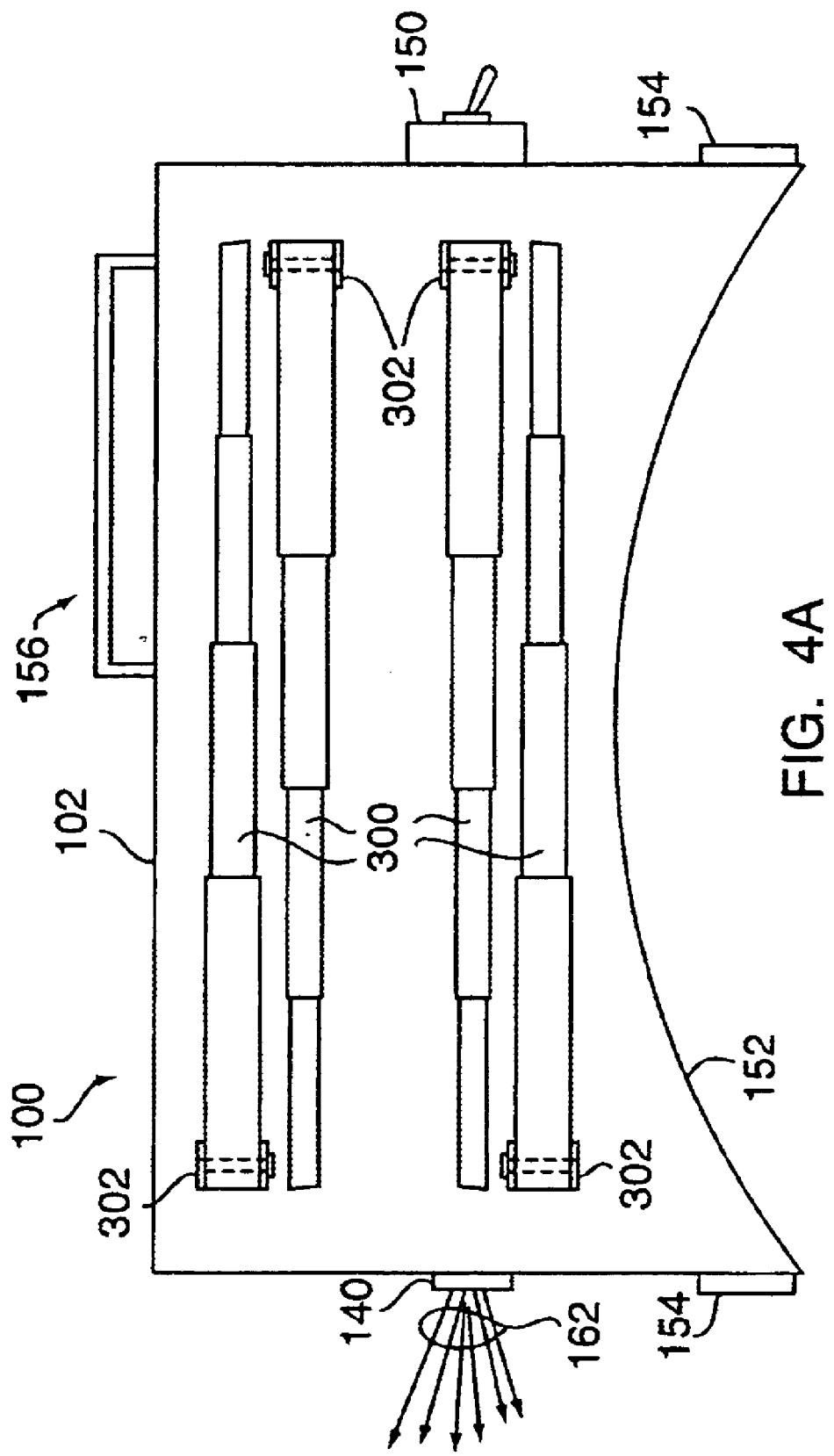

A louver assembly 156 is also shown in FIG. 2 and is utilized to shield an air intake passageway 158 from various forms of precipitation or the like. As will be appreciated, the air intake passageway 158 provides the necessary airflow to the gaseous flow device 110 during operation. FIG. 3 further illustrates the louver assembly 156.

Referring to FIGS. 1–3 in combination, the operation of the scent dispersal apparatus 100 will now be explained. After transport to the area of use, the tripod 134 will be connected to the housing 102 and extended to the desired height. The operator will then open the access door 126, unscrew the jar portion 119 of the scent reservoir 116, fill the jar portion 119 with the liquid animal scent 118 and reengage the jar portion 119 with the lid portion 120. Alternatively, the jar portion 119 may be filled with the liquid animal scent 118 prior to transport. In these situations, an internal valve assembly 160 is utilized in the first conduit 136 to selectively seal the first conduit 136, thereby ensuring that the liquid animal scent 118 does not drain or splash into the gaseous flow device 110. The valve assembly 160 further includes a handle portion protruding from the housing 102 for selective open-and-close operation of the valve assembly 160. It will be readily appreciated that another such valve assembly may be disposed within the second conduit 140 for similar purposes.

After set-up, the operator will then manually trigger the toggle switch 150 to activate the gaseous flow device 110. Alternatively, the gaseous flow device 110 may be remotely activated or timer-set, as discussed previously.

When activated, the gaseous flow device 110 will produce the gaseous stream of air 112 and propel the same through the first conduit 136, thereby agitating the liquid animal scent 118. Molecules of the liquid animal scent 118 will then become entrained in the gaseous stream 112 and exit the scent dispersal apparatus 100 as a scent laden gaseous stream 162 via the second conduit 140. In this manner, the liquid animal scent 118 or, as briefly discussed previously, a solid form animal scent bar deposited in the bottom of the jar portion 119, will give up scent molecules to the gaseous stream 112 generated by the gaseous flow device 110 and the resultant scent laden gaseous stream 162 will be distributed to the ambient atmosphere.

It is envisioned that the scent dispersal apparatus 100 will be the approximate size of a standard shoebox; that is, approximately 12 inches long, 6 inches wide and 5 inches deep to facilitate ease of transportation and to minimize weight. This, however, is an approximate size and the present invention is not limited in this regard. The actual size and shape will be determined in dependence upon the specific components which may be chosen to be accommodated within the housing. The outside of the scent dispersal apparatus 100 may also enjoy a camouflaged finish to further reduce its distinctive qualities when positioned in the field.

While FIGS. 1–3 have described the preferred embodiments of the present invention, there are many modifications, alternative configurations and optional attributes which may be made or added to the scent dispersal apparatuses 100 without departing from the broader aspects of the present invention. For example, the present invention is not limited the gaseous flow device 110 described above as alternative air-stream generators and diffusing devices may be utilized, such as atomizers and ultrasonic or heat-based diffusers.

The scent dispersal apparatus of the present invention may also be equipped with an audio feature as well, such as a recording device along with a speaker system, or the like. This may be used for specific animal calling for hunting or photography. Of course, this sound system may be remotely controlled to allow for operation upon demand while remaining at some distance from the scent dispersal apparatus itself.

Moreover, in addition, or as a substitute, to the use of camouflage discussed previously, the scent dispersal apparatus of the present invention may be adorned with imitation, or real, animal parts. Such parts may be mounted to the out side of the housing and have electronic mobility, also with a remote control. This is also another method for luring animals to a specific location.

The particular method for supporting the scent dispersal apparatus 100 in the field may also be modified without departing from the broader aspects of the present invention. As shown in FIGS. 4 and 4A, the underside of the scent dispersal apparatuses 100 may be equipped with retractable legs 300 that telescopically extend out to 4 feet or more. As mentioned previously, the goal is to elevate the scent dispersal apparatus 100 high enough so the natural wind currents will pick up the scent laden gaseous stream 162 pushed from the unit and continuously spread the same to the surround area. The legs 300 may conveniently be retracted for storage and transportation by folding the legs 300 at pivot points 302. In addition, rather than the legs 300 depicted in FIGS. 4 and 4A, the housing 102 may be alternatively equipped with one or more anchors that may be employed to hang the housing from a tree branch during operation. The present invention contemplates the full range of suspension configurations, including various known hardware pieces which may be affixed to the outer surface of the housing 102 to enable hanging by a rope or the like. Likewise, a pole driven into the earth may be utilized to support the housing whereby the bottom or sides of the housing would be equipped to secure to a distal top end of the pole.

In addition, a strap, a handle or a recess may be formed integral with the housing 102 to permit the carrying of the scent dispersal apparatus, with or without the assistance of wheels or the like to facilitate easier transport.

The present invention is therefore equally applicable in any outdoors situation regardless of the type—or even existence—of large vegetation, such as trees or shrubs. Indeed, although the greatest benefits of the present invention are to be realized when the housing 102 is elevated with respect to the ground, such as by the legs 300, a hanging configuration or a pole apparatus, the bottom of the housing 102 may alternatively support a resilient, non-skid surface for placement on the ground or rock outcropping should the need arise. Moreover, a plurality of straps may be utilized to secure the housing 102 to the trunk of a tree through friction, without departing from the broader aspects of the present invention. When so secured, the arcuate exterior wall 152 of the housing 102 is again effective in approximating the curvature of the tree itself, thus giving a greater amount of stability to the scent dispersal apparatus 100 than heretofore previously known.

Regardless of the particular embodiment utilized, the present invention when taken as a whole permits the effective dispersal of animal attractants in a manner which increases the scope of scent dispersal when employed. As will be appreciated, the present invention also enjoys the capability to accurately regulate the rate at which scent is dispersed by merely regulating the output of the scent laden gaseous stream 162, whether initially provided by the gaseous flow device 110, an integrated compressor, a $CO_2$ container, or the like.

It will be readily appreciated that the housing 102 of the scent dispersal apparatuses 100 may be formed from a metallic or polymer material, or indeed any material which will protect the scent dispersal apparatuses 100 from harsh environmental conditions.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A scent dispersal apparatus, comprising:

a housing having an aperture for permitting gaseous communication between an interior of said housing and an ambient atmosphere;

a gaseous flow device for generating a gaseous stream;

a scent reservoir, wherein said gaseous flow device selectively entrains molecules of a scent disposed within said scent reservoir to form a scent laden gaseous stream, said scent laden gaseous stream being exhausted through said aperture to said ambient atmosphere; and wherein said gaseous flow device directs said gaseous stream to said scent reservoir via a first conduit extending from said gaseous flow device to said scent reservoir, said first conduit including a valve assembly for selectively isolating said scent reservoir from fluid communication with said gaseous flow device.

2. The scent dispersal apparatus according to claim 1, wherein:

said gaseous flow device is one of a blower and a pressurized gas source.

3. The scent dispersal apparatus according to claim 1, wherein:

said scent laden gaseous stream is exhausted to said ambient atmosphere via a second conduit extending from said scent reservoir to said aperture.

4. The scent dispersal apparatus according to claim 1, wherein:

said valve assembly includes a handle extending through an exterior wall of said housing, wherein selective manipulation of said handle causes said valve assembly to occupy one of an open and a closed position.

5. The scent dispersal apparatus according to claim 1, wherein:

said scent is one of a liquid and a solid animal scent; and said animal scent is one of a natural and a synthetic animal scent.

6. The scent dispersal apparatus according to claim 1, wherein:

said gaseous flow device is powered by a battery that is disposed within said housing, said battery being accessible via a battery door formed in said housing.

7. The scent dispersal apparatus according to claim 1, wherein:

said housing includes an air intake opening for providing ambient air to said gaseous flow device; and said air intake opening includes louvers.

8. The scent dispersal apparatus according to claim 1, further comprising:

a plurality of support legs mounted on a bottom of said housing.

9. The scent dispersal apparatus according to claim 1, further comprising:

an access door formed in an exterior wall of said housing for permitting access to said scent reservoir, said access door including a latch assembly for securing said access door in a closed position.

10. The scent dispersal apparatus according to claim 3, wherein:

said scent reservoir is a jar that is threadedly engagable with a lid; and said lid is fixed within said housing and includes a first passage through which said first conduit extends and a second passage through which said second conduit extends.

11. The scent dispersal apparatus according to claim 10, wherein:

said scent is a liquid animal scent;

said first conduit has a distal end extending adjacent to a bottom of said jar, thereby directing said gaseous stream through said liquid animal scent; and said second conduit has a distal end disposed adjacent to a top of said jar and out of contact with said liquid animal scent, thereby permitting the exhaustion of said scent laden gaseous stream to said ambient atmosphere.

12. The scent dispersal apparatus according to claim 1, wherein:

said housing includes an arcuate exterior wall.

13. The scent dispersal apparatus according to claim 1, wherein:

said housing includes insulated exterior walls.

14. The scent dispersal apparatus according to claim 1, further comprising:

a operation switch mounted on said housing for selective activation of said gaseous flow device.

15. A scent dispersal apparatus, comprising:

a housing having a first compartment and a second compartment, said first compartment accommodating a gaseous flow device for generating a gaseous stream and said second compartment accommodating a scent reservoir for holding liquid animal scent;

a first conduit extending from said gaseous flow device and into said scent reservoir, said first conduit having a distal end submerged within said liquid animal scent and disposed adjacent a bottom of said scent reservoir;

a second conduit extending from said scent reservoir and through an aperture in an exterior wall of said housing, said second conduit having a distal end disposed within said scent reservoir yet above the level of said liquid animal scent; and wherein said gaseous flow device directs said gaseous stream through said second conduit and into said liquid animal scent, thereby entraining molecules of said liquid animal scent and forming a scent laden gaseous stream which is exhausted to an ambient atmosphere via said second conduit.

16. The scent dispersal apparatus according to claim 15, further comprising:

a battery disposed within said housing for supplying power to said gaseous flow device; and a battery door formed in an exterior wall of said housing for providing access to said battery.

17. The scent dispersal apparatus according to claim 16, wherein:

said battery is one of a 9 volt and a 12 volt battery.

18. The scent dispersal apparatus according to claim 15, further comprising:

a operation switch mounted on said housing for selective activation of said gaseous flow device; and said first conduit includes a valve assembly for selectively isolating said scent reservoir from fluid communication with said gaseous flow device.

* * * * *